United States Patent
Robbins

[15] 3,675,101
[45] July 4, 1972

[54] POWER WINDOW REVERSING UNIT

[72] Inventor: Samuel B. Robbins, Rochester, Mich.
[73] Assignee: General Motors Corporation, Detroit, Mich.
[22] Filed: May 25, 1970
[21] Appl. No.: 40,991

[52] U.S. Cl. ............................................318/266, 318/447
[51] Int. Cl. .................................................H02p 1/22
[58] Field of Search ..........................318/266, 297, 466, 447

[56] References Cited

UNITED STATES PATENTS 3,581,174  5/1971  Hammer..............................318/266
3,513,374  5/1970  Koment...............................318/266

*Primary Examiner*—Bernard A. Gilheany
*Assistant Examiner*—W. E. Duncanson, Jr.
*Attorney*—J. L. Carpenter and Paul Fitzpatrick

[57] ABSTRACT

A circuit for controlling a power window operating motor having first and second field windings selectively energized to open and close a window. Placement of a switch in a window opening setting energizes the first winding and opens the window. Placement of the switch in a window closing setting energizes the second winding so as to close the window. Should the window encounter an obstacle when closing the current to the second winding will be increased above a certain level, energizing a current responsive relay and a reversing relay that reverses the motor by deenergizing the second winding and energizing the first winding. A time delay network is provided for preventing the window from being reversed for a predetermined time after the switch is placed in the window closing setting so as to prevent reversal of the motor due to its starting current transients. A limit switch responsive to the window position is provided for preventing reversal of the window when the window is substantially closed so as to permit the motor to draw an increased current when it seals the window closed.

7 Claims, 1 Drawing Figure

PATENTED JUL 4 1972 3,675,101
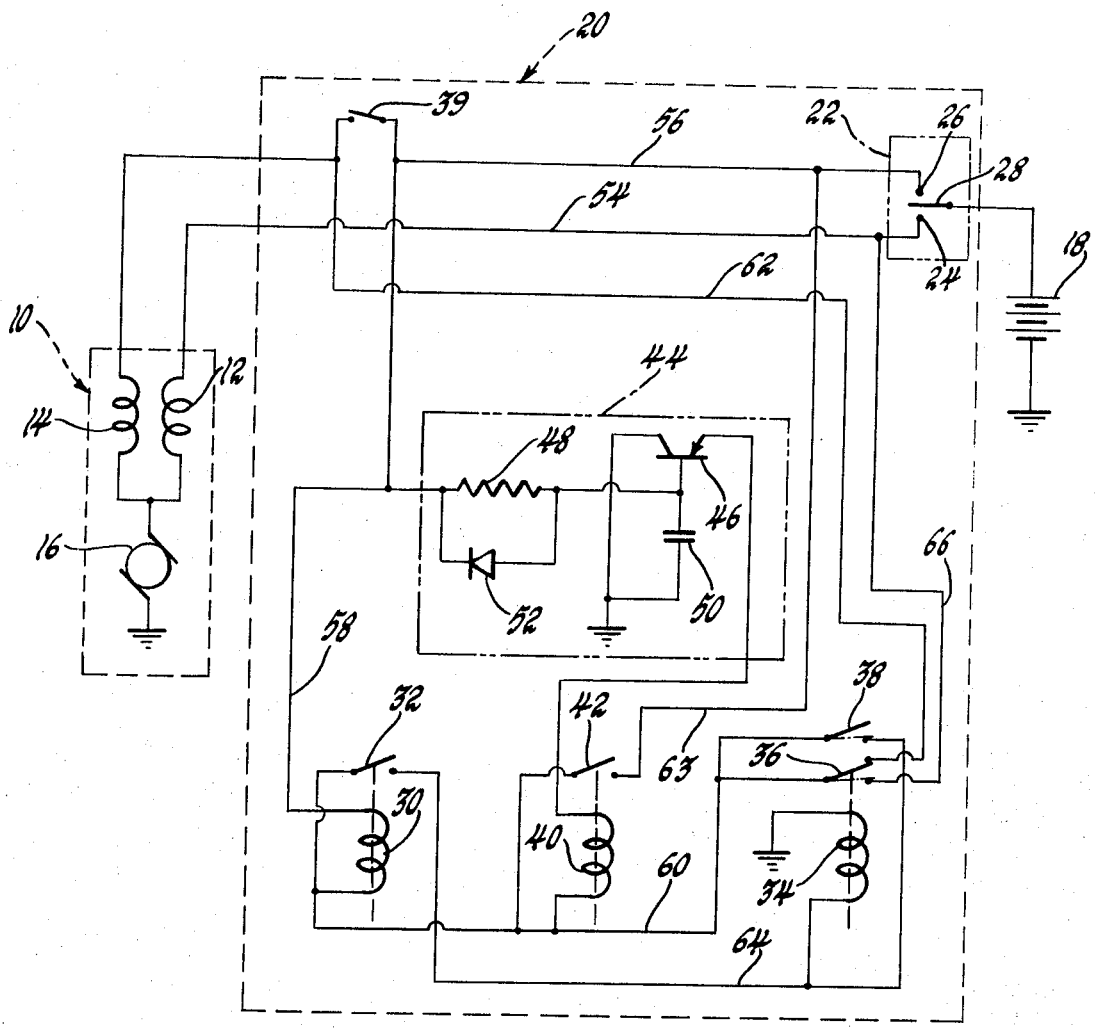
INVENTOR.
Samuel B. Robbins
BY
Paul Fitzpatrick
ATTORNEY

POWER WINDOW REVERSING UNIT

This invention relates to power windows of the well-known type employed in motor vehicles and more particularly to a control circuit for controlling the operation of an electric motor which is drivably connected to a window for opening and closing the window.

Power windows are presently in common use in many motor vehicles. While many ways of operating these windows at the touch of a button have been employed to date one of the more satisfactory approaches to the power operating of a vehicle window utilizes a reversible electric motor having first and second field windings which are selectively energizable by a storage battery in accordance with the position of a manually operable switch. The switch generally employs a movable contact which is normally biased to a neutral position where it is inoperative to energize either of the field windings but which may be placed in either of two other settings to effect operation of the motor, and hence window travel, by energizing a selected field winding of the motor. However, when using some prior power window systems a foreign object which obstructs the window when it is closing may become caught in the window, stalling the window drive motor with possibly damaging results. Accordingly, it is a desirable feature to prevent the motor from stalling when in the process of closing the window. However, since it is required that windows be tightly sealed when fully closed so as to prevent wind noise and water leaks from developing it is desirable that a method of overriding the control circuitry be provided to permit stalling the motor when sealing the window in its fully closed position.

Accordingly, the present invention incorporates the foregoing features by providing a control circuit for a motor driven power window incorporating a provision for monitoring the current supplied to the motor when closing the window and for automatically reversing the direction of the window travel when the monitored current exceeds a certain level. Since large current transients may be generated by the current demands of the motor when it is started there is also provided circuitry for preventing the sensing of the motor current for a predetermined time after the motor has begun to close the window so as to assure that the motor is operating under steady state conditions prior to the monitoring of the motor current. In addition, the subject circuit also contains a provision for preventing the sensing of the motor current when the window is substantially in a closed position so as to permit the motor to tightly seal the window.

Other advantages of the present invention will become apparent from the following description and the accompanying drawing, which schematically illustrates a power window operating system incorporating the principles of the subject invention.

As is seen in the drawing, a motor 10 having first and second field windings 12 and 14 and an armature 16 is provided for opening and closing a window (not shown) through suitable mechanical driving members (not shown). A power source, which may be a vehicle battery 18 of a well-known storage type, is provided for energizing the windings 12 and 14 in accordance with the operation of a control circuit generally indicated at 20.

The control circuit 20 includes a manually operable switch 22 having a pair of fixed contacts 24 and 26 and a switch arm 28 for selectively connecting the contacts 24 and 26 to the battery 18. Though persons versed in the art will appreciate that various switch mechanisms may be used as the switch 22, the switch 22 in the illustrated embodiment is of the well-known motor vehicle type in which the switch arm 25 is spring biased to a neutral position, as illustrated in the drawing, and is manually operable to engage the contacts 24 and 26 so as to place the switch 22 in window opening and window closing settings, respectively.

The control circuit 20 also includes a current responsive relay 30 for monitoring the current being supplied to the motor 10 by the battery 18 and for closing a set of normally open contacts 32 when the monitored current exceeds a predetermined level indicative of the motor 10 being stalled, as when it encounters an obstacle while closing.

In addition, the control circuit 20 includes a reversing relay 34 that is energizable in response to the energization of the current responsive relay 30 so as to reverse the direction of the window travel when the window encounters an obstacle while closing by changing the position of a current directing set of contacts 36 from a first setting, shown in solid lines, where they provide for the energization of the second winding 14, to a second setting, shown in dashed lines, where they provide for the energization of the first winding 12. The reversing relay 34 also provides for latching itself in an energized condition by closing a set of latching contacts 38 when it is first energized. Though the latching contacts 38 connect the reversing relay 34 in parallel with the first winding 12 the reversing relay 34 is selected to have such a large impedance that the current it draws is negligible. Accordingly, by controlling the energization of the windings 12 and 14 the reversing relay 34 provides for the automatic reversal of the motor 10 when the current responsive relay 30 is energized so as to automatically open the window when it has encountered an obstacle and, through its self-latching provision, it provides for continued energization of the first winding 12 and opening of the window until the switch 22 is changed from the window closing setting, as will subsequently be explained.

While the reversal of the motor 10 when it encounters an obstacle is desirable the motor 10 must be able to tightly seal the window closed so as to prevent water leaks and wind noises at the edges of the window. The second winding 14 of the motor 10 must therefore be allowed to generate its maximum torque for sealing the window by drawing an increased current when the window is to be sealed closed. Accordingly, a limit switch 39 that is positioned so as to be responsive to the window position is provided in the control circuit 20 for completing a direct current path from the switch 22 to the second winding 14 when the window is substantially in its closed position. The current responsive relay 30 is thus bypassed so as to preclude it from monitoring the current to the second winding 14 and causing reversal of the window travel when the window is substantially closed.

As is common in motors controlled by energization of their field windings, the motor 10 draws a relatively large current when the second winding 14 is initially energized to close the window. Inasmuch as these current transients in the control circuit 20 may be quite large it is desirable that the current responsive relay 30 be prevented from monitoring the current supplied to the second winding 14 for a predetermined time after the switch 22 is placed in the window closing setting, which time may be on the order of three tenths of a second. Accordingly, a starting relay 40 is provided in the control circuit 20 for preventing the current responsive relay 30 from monitoring the current being supplied to the second winding 14 during this predetermined time. The starting relay 40 is series connected with the current responsive relay 30 but is selected so as to draw very little current and becomes energized at lower current levels than the current responsive relay 30. Accordingly, the starting relay 40 becomes energized as soon as the switch 22 is placed in the window closing setting. As soon as the starting relay 40 is energized it closes a set of normally open contacts 42 that are connected in parallel with the current responsive relay 30 so as to prevent the current responsive relay 30 from being energized by directly connecting the switch 22 to the starting relay 40.

A time delay network 44 is provided in the control circuit 20 for assuring that the current responsive relay 30 remains inoperative for the predetermined time by assuring that the starting relay 40 remains energized for this time period. The time delay network 44 assures that the starting relay 40 remains energized for the predetermined time by maintaining a transistor 46, which is series connected with the starting relay 40, conductive for the predetermined time, which is dependent upon an RC timing network that includes a resistor 48 and a capacitor 50. Since the capacitor 50 is normally drained of charge through a diode 52 and is connected to the base of the transistor 46 both the base and the collector of the transistor 46 are at ground potential when the switch 22 is placed in the window closing setting. Accordingly, the transistor 46 is initially conductive and allows current through the starting relay 40 until the capacitor 50 has been sufficiently charged through the resistor 48 to reverse bias the emitter-base junction of the transistor 46, at which time the starting relay 40 is deenergized and the current responsive relay 30 is allowed to monitor current through the second winding 14.

The operation of the subject apparatus will now be explained. To open the window the switch 22 is placed in the window opening setting by moving the switch arm 28 so as to engage the contact 24. A circuit is thus completed through the battery 18, the switch 22, a lead 54, the first winding 12 and the armature 16 so as to energize the first winding 12 and open the window so long as the switch arm 28 engages the contact 24. By providing a direct electrical connection between the battery 18 and the first winding 12 the motor 10 is allowed to generate its maximum torque, through stalling if necessary, while opening the window. It is thus anticipated that the motor 10 should be able to open the window whenever desired even though the window may be susceptible to being iced closed under adverse weather conditions.

When it is desired to close the window the switch 22 is placed in the window closing setting by engaging the contact 26 with the switch arm 28. The switch 22 thus initially completes a circuit from the battery 18 through leads 56 and 58, the current responsive relay 30, a lead 60, the contacts 36, a lead 62, the second winding 14, and the armature 16. Accordingly, the second winding 14 is initially energized through the current responsive relay 30 when the switch 22 is placed in the window closing setting. However, when the second winding 14 is energized through the preceding circuit the potential at the lead 60 becomes sufficient to energize the starting relay 40 through the transistor 46 before the current responsive relay 30 is able to become energized, i.e. picked up. Upon energization of the starting relay 40 the contacts 42 are closed so as to short the current responsive relay 30 and maintain the energization of the second winding 14 through a circuit that includes a lead 63 and the contacts 42.

Since the base of the transistor 46 is initially at ground potential substantially the entire voltage of the battery 18 is placed across the resistor 48, causing the resistor 48 to conduct a charging current to the capacitor 50. When the accumulated charge on the capacitor 50 is sufficient to reverse bias the emitter-base junction of the transistor 46 it turns off the transistor 46 so as to deenergize the starting relay 40, which opens the contacts 42 and provides for continued energization of the second winding 14 through its first described energization circuit that included the current responsive relay 30.

Should the window not encounter an obstacle while it is being closed by the motor 10 the current in the current responsive relay 30 will remain insufficient to cause its energization and the continued energization of the second winding 14 will effect closure of the window. When the window is substantially closed the limit switch 39 is closed so as to complete a direct current path between the leads 56 and 62, which assures uninterrupted energization of the second winding 14 and allows the motor 10 to draw an increased current and stall as it seals the window tightly closed.

Should the window encounter an obstacle while closing at a time when the current to the second winding 14 is being monitored by the current responsive relay 30 the motor 10 will be stalled and its current demands will be increased. When the current through the current responsive relay 30 to the second winding 14 increases sufficiently to exceed the certain level at which the current responsive relay 30 is energized, the contacts 32 are closed so as to connect the reversing relay 34 in series circuit with the current responsive relay 30 through a lead 64. The reversing relay 34 is thus energized and change the setting of the current directing contacts 36 from their normal position illustrated in solid lines to their current reversing position illustrated in dashed lines. As the current directing contacts 36 move from their normal position the current flow through the contacts 36 to the second winding 14 is discontinued so as to momentarily deenergize the windings 12 and 14 of the motor 10 but as soon as the current directing contacts 36 are in their current reversing position they complete a circuit through a lead 66 and the lead 54 to the first winding 12. The second winding 14 is thus automatically deenergized and the first winding 12 is automatically energized when the window encounters an obstacle so as to immediately initiate the opening of the window even though the first winding 12 is being supplied current through the current responsive relay 30 and the switch 22 is in the window closing setting. While the current drawn by the first winding 12 may be insufficient to keep the current responsive relay 30 energized, which would assure the continued energization of the reversing relay 34, the reversing relay 34 is maintained in its energized condition by the closure of the latching contacts 38. Upon closure of the latching contacts 38, which are connected in parallel with the contacts 32, the reversing relay 34 is series connected with the current responsive relay 30 through the lead 60. The reversing relay 34 and the first winding 12 are thus continuously energized by the battery 18 through the switch 22 and the current responsive relay 30 so long as the switch 22 is held in the window closing setting.

It is thus apparent that the aforedescribed invention provides for controlling the operation of a window in a variety of situations, though modifications of the illustrated embodiment, such as employing switching devices of other types in place of the relays in the control circuit, may be made without departing from the spirit of the invention herein described. These and other modifications will be apparent to persons versed in the art.

What is claimed is:

1. Apparatus for controlling the operation of a reversible electric motor selectively energizable by a power source so as to be effective in a first energized condition to open a window and in a second energized condition to close the window comprising, in combination, means for connecting the motor to the power source, switch means having window opening and window closing settings for opening and closing the window, means effective to complete a circuit through the power source and the motor when the switch is in the window opening setting so as to place the motor in its first energized condition, means effective to complete a circuit through the power source and the motor when the switch is in the window closing setting so as to place the motor in its second energized condition, means responsive to the current drawn by the motor when the motor is in its second energized condition and actuable when the current exceeds a predetermined level indicative of the window encountering an obstacle, means responsive to the current responsive means for preventing the motor from assuming its second energized condition and for causing the power source to place the motor in its first energized condition when the current responsive means has been actuated so as to effect opening of the window so long as the switch is in the window closing setting, starting means responsive to movement of the switch means to the window closing setting and actuable when the current through the motor in the second energized condition of the latter exceeds another predetermined level below the first mentioned predetermined level for rendering the current responsive means insensitive to the current surge accompanying initial energization of the motor in the second energized condition thereby to prevent actuation of the current responsive means, and time delay means associated with the starting means for rendering the starting means inoperative after a predetermined time subsequent to movement of the switch means to the window closing setting so that the current responsive means and the means responsive thereto can thereafter cooperate in placing the motor in its first energized condition at substantially the instant the current through the motor in the second energized condition thereof exceeds the first mentioned predetermined level.

2. Apparatus for controlling the operation of a reversible electric motor having first and second field windings selectively energizable to open and close a window comprising, in combination, a power source, switch means having window opening and window closing settings for opening and closing the window, means effective to complete a first circuit through the power source and the first winding when the switch is in the window opening setting for energizing the first winding so as to open the window, means effective to complete a second circuit through the power source and the second winding when the switch is in the window closing setting for energizing the second winding so as to close the window, means responsive to current in the second circuit and actuable to indicate when current therethrough exceeds a predetermined level indicative of the window encountering an obstacle, means responsive to the current responsive means for opening the second circuit and for completing a third circuit through the power source and the first winding when the current responsive means has been actuated so as to deenergize the second winding and energize the first winding, thereby reversing the window travel so as to open the window until the switch is removed from the window closing setting or the window is fully opened, and starting means for completing a fourth circuit through the power source and the second winding for a predetermined time upon initial placement of the switch in the window closing setting, thereby energizing the second winding and preventing starting current transients of the motor from actuating the current responsive means so as to effect reversal of the motor during the predetermined time.

3. Apparatus for selectively energizing a reversible power window motor that is effective when energized in a first energized condition to open a window and when energized in a second energized condition to close the window comprising, in combination, a switch having at least window opening and window closing settings, means for placing the motor in the first energized condition when the switch is placed in the window opening setting so as to open the window, means for placing the motor in the second energized condition when the switch is placed in the window closing setting so as to close the window, current sensing means for sensing the current draw of the motor when it is in the second energized condition, means responsive to the current sensing means effective to place the motor in the first energized condition when the current drawn by the motor while in the second energized condition has exceeded a certain level, thereby reversing the window travel when the motor is stalled sufficiently for the current draw of the motor in the second energized condition to exceed the certain level so as to open the window until the switch is removed from the window closing setting or the window is fully opened, means responsive to the window position for rendering the current sensing means inoperative when the window is substantially closed so as to prevent reversal of the motor when the motor is stalled while sealing the window closed, starting means responsive to movement of the switch to the window closing setting and actuable when the current through the motor in the second energized condition of the latter exceeds another predetermined level below the certain level for rendering the current sensing means insensitive to the current surge accompanying initial energization of the motor in the second energized condition, and time delay means associated with the starting means for rendering the starting means inoperative after a predetermined time subsequent to movement of the switch to the window closing setting so that the current sensing means and the means responsive thereto can thereafter cooperate in placing the motor in its first energized condition at substantially the instant the current through the motor in the second energized condition thereof exceeds the certain level.

4. Apparatus for controlling the operation of a power window which is opened and closed by an electric motor having first and second field windings selectively energizable to open and close the window comprising, in combination, a power source, a switch having at least window opening and window closing settings for selectively operating the window, the switch completing a current path through the power source and the first winding when in the window opening setting, so as to energize the first winding and open the window, a current responsive relay energizable when current through the relay exceeds a predetermined level, means for energizing the second winding through a current path which includes the power source and the relay when the switch is placed in the window closing setting, switching means responsive to the relay effective to open the current path through the second winding and to energize the first winding when the relay has been energized, thereby effecting opening of the window while the switch is in the window closing setting, starting means responsive to movement of the switch to the window closing setting and actuable when the current through the second field winding of the motor exceeds another predetermined level below the first mentioned predetermined level for preventing energization of the relay in response to the current surge accompanying initial energization of the second field winding of the motor, and time delay means associated with the starting means for rendering the starting means inoperative after a predetermined time subsequent to movement of the switch to the window closing setting so that the relay and the switching means can thereafter cooperate in energizing the first field winding of the motor at substantially the instant the current through the second field winding of the motor exceeds the first mentioned predetermined level.

5. Apparatus for selectively energizing the windings of a reversible power window motor having a first field winding effective when energized to cause the motor to open a window and a second field winding effective when energized to cause the motor to close the window comprising, in combination, a switch having at least window opening and window closing settings, means for energizing the first winding when the switch is placed in the window opening setting so as to open the window, means for energizing the second winding when the switch is placed in the window closing setting so as to close the window, current sensing means for sensing the current draw of the second winding, means responsive to the current sensing means effective to deenergize the second winding and energize the first winding when the current drawn by the second winding has exceeded a certain level, thereby reversing the window travel when the motor is stalled sufficiently for the current draw of the second winding to exceed the certain level and opening the window until the switch is removed from the window closing setting or the window is fully opened, means responsive to the window position for rendering the current sensing means inoperative when the window is substantially closed so as to prevent reversal of the motor when the motor is stalled while sealing the window closed, starting means responsive to movement of the switch to the window closing setting and actuable when the current through the second field winding of the motor exceeds another predetermined level below the certain level for rendering the current sensing means insensitive to the current surge accompanying initial energization of the second field winding of the motor, and time delay means associated with the starting means for rendering the starting means inoperative after a predetermined time subsequent to movement of the switch to the window closing setting so that the current sensing means and the means responsive thereto can thereafter cooperate in energizing the first field winding of the motor at substantially the instant the current through the second field winding of the motor exceeds the certain level.

6. Apparatus for opening and closing a window comprising, in combination, a reversible motor having first and second field windings, the motor being drivably connected to the window so as to open the window when the first winding is energized, and to close the window when the second winding is energized, a power source, a switch having at least window opening and window closing settings for opening and closing the window, the switch being operable when in the window opening setting to complete a circuit through the power source and the first winding so as to energize the first winding and effect opening of the window, a current responsive relay energizable when current therethrough exceeds a certain level in series circuit with the power source and the second winding for sensing the current in the second winding, the power source energizing the second winding through the current responsive relay when the switch is in the window closing setting, a reversing relay responsive to the current responsive relay effective to connect the first winding in place of the second winding in the series circuit when the current responsive relay has been energized, thereby energizing the first winding and opening the window so long as the switch remains in the window closing setting, time delay means including a starting relay responsive to the switch setting and effective upon placement of the switch in the window closing setting to prevent the current responsive relay from being energized for a predetermined time, thereby preventing starting current transients of the motor from energizing the current responsive relay, and means responsive to the window position and effective to prevent the current responsive means from being energized when the window is substantially closed so as to permit the motor to draw currents greater than the certain level when sealing the window closed.

7. Apparatus for controlling the operation of a reversible electric motor having first and second field windings selectively energizable to open and close a window comprising, in combination, a power source, switch means having window opening and window closing settings for opening and closing the window, means effective to complete a circuit through the power source and the first winding when the switch is in the window opening setting for energizing the first winding so as to open the window, means effective to complete a circuit through the power source and the second winding when the switch is in the window closing setting for energizing the second winding so as to close the window, means responsive to current in the circuit through the second winding and actuable when current therethrough exceeds a predetermined level indicative of the window encountering an obstacle, current directing means responsive to the current responsive means for preventing the energization of the first winding and for completing a circuit through the power source and the second winding when the current responsive means has been actuated so as to effect opening of the window so long as the switch is in the window closing setting, starting means responsive to movement of the switch means to the window closing setting and actuable when the current through the second field winding of the motor exceeds another predetermined level below the first mentioned predetermined level for rendering the current responsive means insensitive to the current surge accompanying initial energization of the second field winding of the motor thereby to prevent actuation of the current responsive means, and time delay means associated with the starting means for rendering the starting means inoperative after a predetermined time subsequent to movement of the switch means to the window closing setting so that the current responsive means and the current directing means can thereafter cooperate in energizing the first winding of the motor at substantially the instant the current through the second winding of the motor exceeds the first mentioned predetermined level.

* * * * *